June 10, 1969    W. S. PIERCE ET AL    3,448,465
PIVOTED BUTTERFLY TYPE HEART VALVE
Filed July 11, 1966
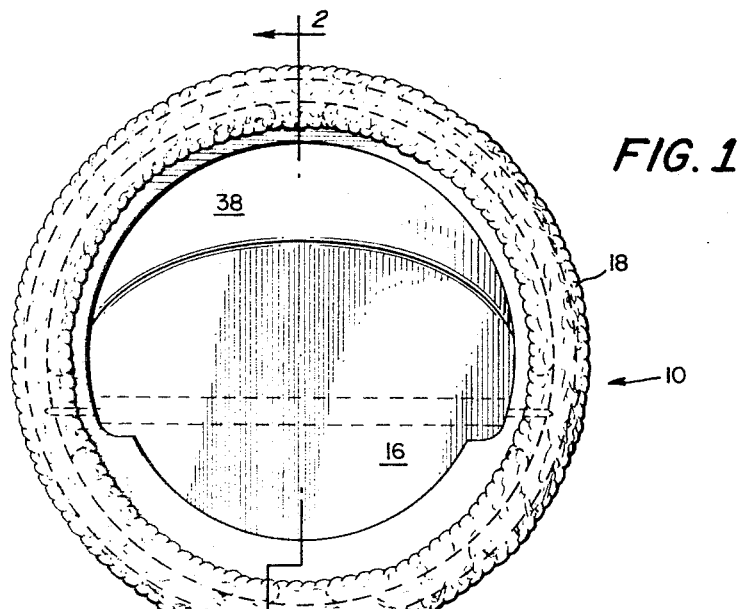
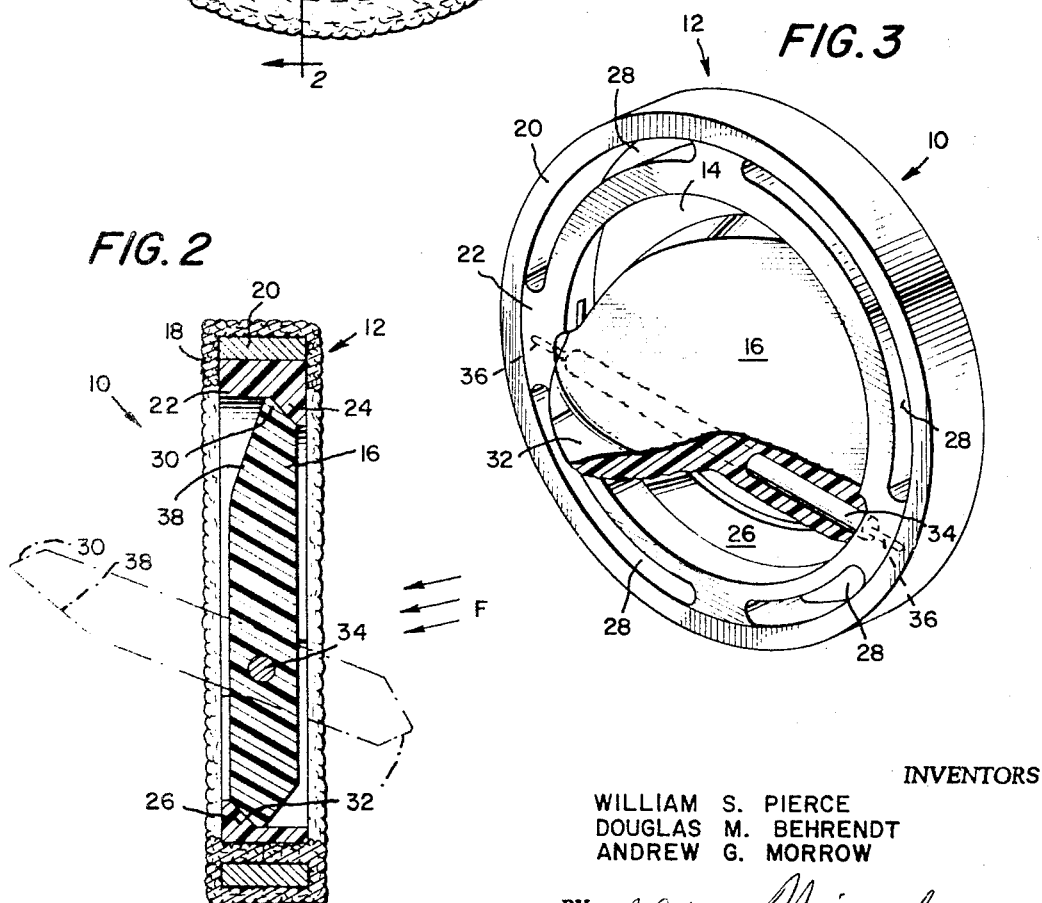
INVENTORS
WILLIAM S. PIERCE
DOUGLAS M. BEHRENDT
ANDREW G. MORROW
BY
ATTORNEY

# United States Patent Office 3,448,465
Patented June 10, 1969

3,448,465
PIVOTED BUTTERFLY TYPE HEART VALVE
William S. Pierce, Philadelphia, Pa., Andrew G. Morrow, Rockville, Md., and Douglas M. Behrendt, Winchester, Mass., assignors to the United States of America as represented by the Secretary of Health, Education, and Welfare
Filed July 11, 1966, Ser. No. 564,090
Int. Cl. A61f 1/00; F16k 15/00, 17/00
U.S. Cl. 3—1           9 Claims

ABSTRACT OF THE DISCLOSURE

A heart valve constructed of rigid parts, which is long-lasting and which causes less interference with blood flow than previous constructions; it has a rigid plastic, ring-like valve body sewn into place by means of an attached ring of synthetic fabric, and incorporates a central plastic valve disc of air foil cross-section which is eccentrically mounted thereby swinging open in response to the forward flow of blood.

---

The present invention relates to a heart valve and, more particularly to an artificial, prosthetic cardiac valve of the butterfly type.

The use of artificial, prosthetic cardiac valves including the replacement of diseased heart valves, is now common practice in heart surgery. Thus, more than 25,000 artificial heart valves have now been used in human patients. The most commonly used of these artificial valves is the ball and cage type valve. Other known valves, including those using flaps of various types, have not proven as successful as the ball and cage type valve.

However, the ball and cage type valve utilizes an elastomer ball which relies, for extended use, upon the continuing elastomeric properties of the ball. In addition, such ball valves require a "cage" or retaining struts to maintain the ball in close proximity to its valve seat and these retaining struts extend into and across the blood stream. In addition, when such ball valves are open, the flow of blood must pass around the ball which is a relatively bulky object and which takes up a significant portion of the cross section of the normal blood flow. These are significant disadvantages which are obviated by the present invention.

It is therefore an object of the present invention to provide a new and improved heart valve which obviates and/or alleviates the deficiencies of the prior art, such as indicated above.

It is another object of the present invention to provide for a new and improved and highly efficient prosthetic cardiac valve.

It is another object of the present invention to provide a heart valve which has no elastomer ball and which has no retaining struts present in the blood stream.

It is another object of the present invention to provide a cardiac valve which permits blood flow thereabout in a reasonably laminar form.

It is another object of the present invention to provide an artificial heart valve wherein the orifice area compared to the outside area is very large so that a low pressure gradient is present even at high flow rates.

It is another object of the present invention to provide a heart valve which is light in weight.

It is another object of the present invention to provide an artificial heart valve which is very simple in operation and thereby very dependable.

These and other objects and the nature advantages of the present invention will be more clear from the following detailed description taken in conjunction with the following drawing wherein:

FIG. 1 is a front elevation of a heart valve in accordance with the present invention;
FIG. 2 is a section taken along line 2—2 FIG. 1; and
FIG. 3 is a perspective of the valve of FIG. 1 looking generally from the upstream side.

In general, the cardiac valve in accordance with the present invention comprises an annular valve body having a valve seat along its inner periphery and a thin, streamlined, essentially planar butterfly type valve member which seats within the opening of the annular valve body and which is pivoted about an axis passing therethrough, which axis is off-center. It is also essential that the valve body have suitable means so that the valve may be attached to animal tissue.

A preferred embodiment of the cardiac valve is shown in FIGS. 1–3 at 10 and comprises an essentially planar annular valve body 12 defining an opening 14 therethrough within which seats a thin, streamlined, essentially planar butterfly type valve member 16. A cloth sewing ring 18 is provided about the outer portion of the valve body to provide means by which the entire valve assembly can be sutured to the cardiac tissue.

The valve body 12 is preferably composed of an outer peripheral portion 20 and an inner seat-forming portion 22. The inner seat forming portion 22 has, along its inner peripheral surface, a pair of generally semi-circular valve seats 24 and 26, each of which faces inwardly towards the center of the valve structure, as can best be seen in FIG. 2. Each of the semi-circular valve seats 24 and 26 terminates at the pivot axis of the valve member 16.

Semi-circular apertures 28 are provided in the valve body 12 and are located generally between the outer peripheral portion 20 and the inner seat-forming portion 22. These semi-circular apertures are provided for the attachment of the cloth 18 which extends therethrough so that such cloth 18 is wrapped about the outer peripheral portion 20; the valve 10 may thereby be ultimately sutured in place to the cardiac tissue.

The thin, streamlined essentially planar butterfly type valve member 16 is adapted to seat—when the valve is closed—against the pair of semi-circular valve seats 24 and 26; in order to provide proper seating the valve member 16 is provided with a pair of inclined outwardly facing surfaces 30 and 32 which mate, respectively, with the inclined inwardly facing valve seats 24 and 26. As with the valve seats, the mating surfaces 30 and 32 extend partly circumferentially about the valve member and terminate adjacent the pivot axis of the valve member 16.

The valve member 16 is held within the valve body 12 by an eccentrically located pivot axis assembly which is preferably formed from a conical ended axle 34 which passes through the valve member in the plane thereof and is rigidly connected thereto, and a pair of bearing pins 36 each of which are fixed to the valve body 12 at the seat forming portion 22 adjacent the location where each of the inclined surfaces 24, 26, 30 and 32 terminate. The valve member 16 is permitted to rotate as shown in FIGS. 2 and 3 by the sliding action occurring between the bearing pins 36 and the axle 34.

The eccentric pivot axis, e.g. axle 34, permits the valve member 16 to pivot out of the opening 14 and out the plane of the valve body 12 as shown in FIGS. 2 and 3. When the valve member 16 takes the position shown in phantom in FIG. 2 the valve is open and the inclined surfaces 30 and 32 are out of contact with the seats 24 and 26, respectively. This permits the blood to flow about the thin, streamlined valve member 16 on both sides thereof in the direction F shown in FIG. 2. Because the pivot axis is located off center along the length between the ends of the valve, the valve is sensitive to the exertion of pressure by the blood in both directions. Thus, the valve opens rapidly when blood flows in the direction F and closes rapidly when blood attempts to flow in the opposite direction. Movement occurs because the force on the major segment of the member 16 (the portion above the axle 35 in the drawing) is greater than on the minor segment (the portion below the axle 35). The net force decreases as the valve 10 opens and as the surfaces of the valve member 16 approach the direction of the force vector.

Usually, both the valve body 12 and the valve member 16 are circular since this configuration provides the greatest effeciency and, also, is the shape of the natural blood passages. Thus, where the valve member 16 is circular, the pivot axis including the axle 35 forms a chord of the circle.

It has also been found useful to incorporate an air foil cross section in the shape of the valve member 16. Such as air foil cross section is provided at the location furthest away from the pivot axis on the valve member 16 and the air foil cross section may merely comprise an inclined planar portion 38 on the valve member 16 which causes such member 16 to become thin at the end thereof. By incorporating such an air foil cross section into the valve member 16 to provide lift in the flowing stream, and by varying the ratio between the major and minor segment areas of the circular valve member 16, a variety of opening angles can be obtained. It has been found that the angle of opening appears to be independent of the valve position.

It is important that all the components of the valve 10 be formed of materials which are inert to body tissue. Such materials must be resistant to corrosion, must be non-carcinogenic and otherwise non-toxic and must not effect the clotting of blood. Such materials are known and include both metals such as high chromium stainless steel, titanium, etc., and plastics, such as reinforced inert thermosetting plastics including glass reinforced polyesters and epoxys, acrylic resins, polycarbonate resin, formaldehyde polymers, polyamides, etc. It is preferred that the outer peripheral portion 20 of the valve body be formed of inert metal such as titanium to increase the strength and rigidity of the valve, that the axle 34 also be formed of metal for improved strength and wearing properties, and that the pins 36 be formed either of bearing type metal or a bearing type plastic. The seat forming portion 22 of the valve body 12 and the valve member 16 are preferably formed of plastic such as polycarbonate resin or an acrylin resin. The cloth sewing ring 18 is preferably formed of polyethylene terephthalate (Dacron) fabric, although other synthetic plastic fabrics such as polytetrafluoroethylene fabric may also be used.

It will be obvious to those skilled in the art that various changes may be made without departing from the scope of the invention and therefore the invention is not intended to be limited to what is shown in the drawings and described in the specification, but only as set forth in the appended claims.

What is claimed is:

1. A cardiac valve for the surgical insertion into an animal heart comprising:
   an essentially planar annular valve body defining an opening therethrough having a pair of internally facing valve seats along the inner periphery thereof;
   a thin, streamlined, essentially planar butterfly type valve member for seating in said valve seats, said valve member being essentially complementary in size and shape to the opening defined by said annular valve body;
   means to pivot said valve member out of said opening and out of the plane of said valve body and out of contact with said valve seats to open said valve and permit blood to flow about said thin, streamlined valve member on both sides thereof, said pivoting taking place about an axis passing through the plane of said valve member and said valve body at a location off center along the length between the ends of said valve, said valve seats each terminating adjacent said axis; and
   means to attach said valve body to animal tissue, said cardiac valve being formed of inert and non-toxic material.

2. A heart valve in accordance with claim 1 wherein said valve body opening and said valve member are generally circular, said axis of pivot is chordal through said valve member, and said facing valve seats are semi-circular each terminating at said chordal axis of pivot.

3. A heart-valve in accordance with claim 2 wherein said valve body and said valve member comprise inert plastic material.

4. A heart-valve in accordance with claim 3 wherein said valve body comprises an outer peripheral portion formed of an inert metal.

5. A heart-valve in accordance with claim 2 wherein said means to attach said valve body comprises inert cloth material passing through apertures defined in said valve body and surrounding the outer portion of said valve body, said cloth being adapted to be sutured to animal tissue.

6. A heart-valve in accordance with claim 2 wherein said semi-circular valve seats each comprise an inclined inwardly facing surface which mates with a complementary inclined outwardly facing surface extending partly circumferentially about said valve member.

7. A heart-valve in accordance with claim 2 wherein said valve member has an airfoil cross-section comprising an inclined, thin portion at the location furthest away from said axis.

8. A heart-valve in accordance with claim 2 wherein said valve body comprises an outer peripheral portion, an inner seat-forming portion engaging the inner peripheral surface of said outer peripheral portion and defining semi-circular openings therebetween, and cloth material passing through said semi-circular openings and surrounding said outer peripheral portion; said outer peripheral portion being fomed of metal and said inner seat-forming portion being formed of plastic.

9. A heart-valve in accordance with claim 2 wherein said means to pivot said valve member comprises an axle passing through said valve member and rigidly connected thereto, and a pair of bearing pins, each bearing pin being rigidly embedded in said valve body adjacent the terminus of said seats and passing into the end of said axle for pivotal movement thereagainst.

References Cited

UNITED STATES PATENTS

| 2,750,955 | 6/1956 | Bredtschneider et al. |
| | | 137—527.8 XR |
| 2,888,036 | 5/1959 | Reppert _____ 137—527.8 XR |
| 2,934,084 | 4/1960 | Adams _____ 137—527.4 |
| 3,370,305 | 2/1968 | Goott et al. _____ 3—1 |

OTHER REFERENCES

"Mitral valve prosthesis" by Dr. Bruce Paton, The Bulletin of the Dow Corning Center for Aid to Medical Research, vol. 5, No. 4, October 1963, p. 16.

"A Hinged-Leaflet Valve for Total Replacement of the Human Aortic Valve" by Vincent L. Gott et al., Journal of Thoracic and Cardiovascular Surgery, vol. 48, No. 5, November 1964, pp. 713–725.

RICHARD A. GAUDET, Primary Examiner.

RONALD L. FRINKS, Assistant Examiner.

U.S. Cl. X.R.

137—527.8